United States Patent Office 3,204,969
Patented Sept. 7, 1965

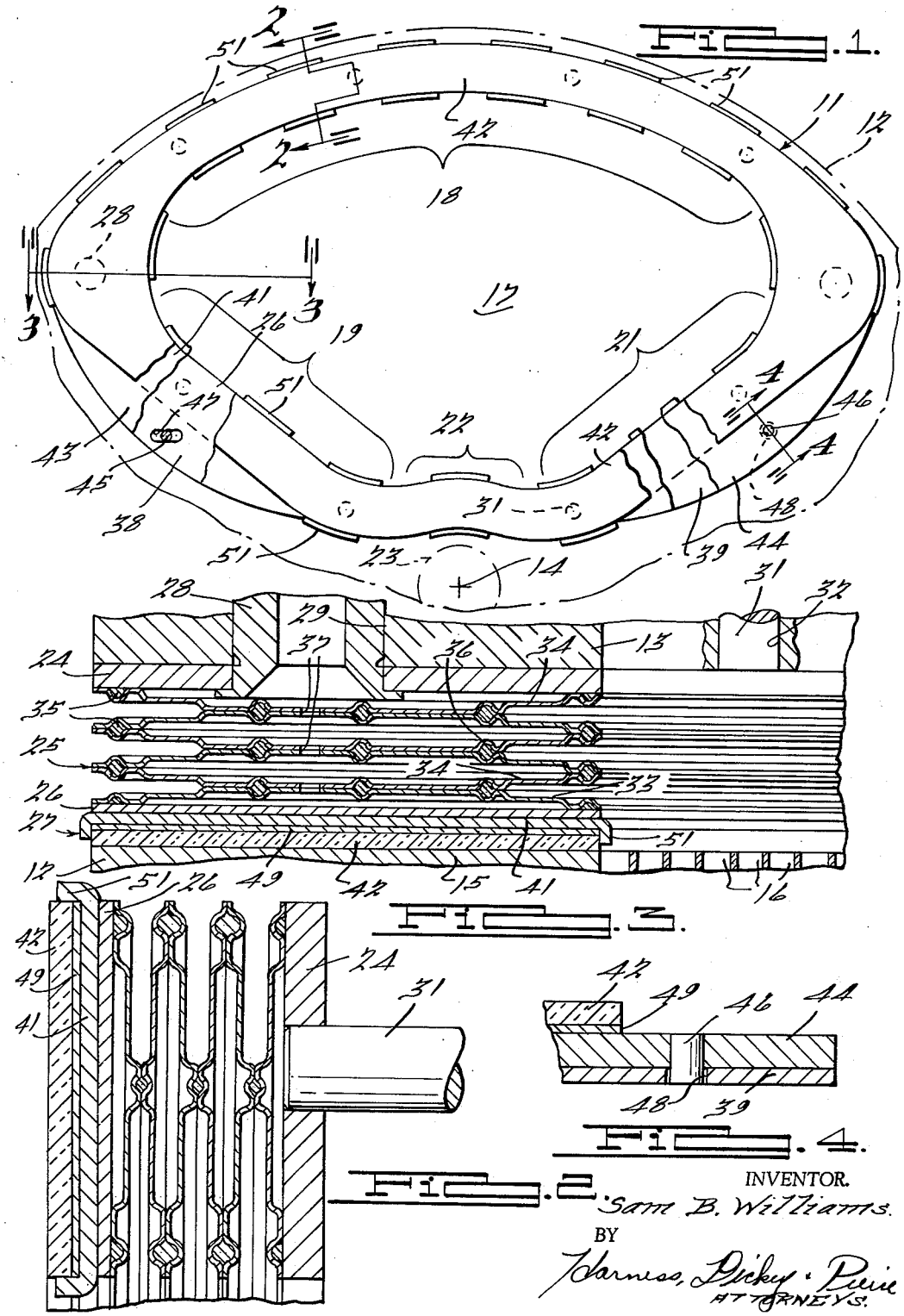

3,204,969
HIGH PRESSURE DYNAMIC SEAL
Sam B. Williams, Walled Lake, Mich., assignor to Williams Research Corporation, Walled Lake, Mich., a corporation of Michigan
Filed Apr. 26, 1963, Ser. No. 275,928
5 Claims. (Cl. 277—34)

This invention relates to seals, and more particularly to high pressure dynamic seals of the type adapted for use with rotary gas turbine regenerator cores.

It is an object of the invention to provide a novel and improved high pressure dynamic seal for use with gas turbine regenerator cores in which the rubbing member may be fabricated of a nonmetallic material having the desired flexural, hardness, anti-friction and temperature resistance characteristics, but which nevertheless permits quick and easy replacement of the rubbing member when worn without the necessity of discarding or removing the other portions of the seal.

Other objects, features, and advantages of the present invention will become apparent from the subsequent description, taken in conjunction with the accompanying drawings, in which:

FIGURE 1 is a side elevational view of a suitable embodiment of a seal incorporating the principles of the invention;

FIGURE 2 is an enlarged cross-sectional view taken along the line 2—2 of FIGURE 1 and showing the seal components;

FIGURE 3 is an enlarged cross-sectional view taken along the line 3—3 of FIGURE 1 and showing the seal construction in the vicinity of the compressed air connection; and FIGURE 4 is a fragmentary cross-sectional view taken along the line 4—4 of FIGURE 1 and showing a pin-and-aperture connection between the rubbing shoe backup plate and the subshoe.

Briefly, the illustrated embodiment of the invention comprises a flat metallic base having a configuration which encloses the area through which the compressed air passes, an expandable metal bellows having one end secured to the base, and a metal subshoe secured to the other end of the bellows, the bellows, base and subshoe enclosing a common pressurizable chamber. The rubbing shoe assembly comprises a rubbing shoe fabricated of a material such as graphite or Pyroceram having the desired antifriction, wear, temperature resistance and flexural characteristics, together with a metal backup plate to which the rubbing shoe is bonded. Retaining lugs for the rubbing shoe are provided on the edges of the backup plate. The subshoe and backup plate have overlapping ears extending from the main seal configuration, and pin-and-aperture connections are provided on these ears for removably mounting the rubbing shoe assembly to the subshoe.

Referring more particularly to the drawings, the seal is generally indicated at 11 and is intended to be disposed between a gas turbine regenerator core 12 and a housing portion 13 of the gas turbine which conducts compressed air to or from the regenerator. Regenerator 12, shown partially in phantom lines in FIGURE 1, is of the rotary type which passes alternately through ducts carrying compressed air from the compressor to the burner and ducts carrying hot exhaust gasses from the last turbine stage to the turbine exhaust system. The axis of rotation of regenerator 12 is indicated at 14, the regenerator having a solid outer rim 15 and a matrix having passages 16 through which the compressed air passes into or from the area marked 17 in FIGURE 1, this area being enclosed by the seal. The general configuration of the seal includes an outer portion 18 of arcuate shape concentric with axis 14, radial portions 19 and 21 extending inwardly from portion 18, and an inner portion 22 connecting portions 19 and 21. Portions 18, 19, 21 and 22 may be faired into each other, portion 22 being shaped so as to clear the regenerator hub 23.

Seal 11 comprises a base 24, a bellows generally indicated at 25, a subshoe 26, and a rubbing shoe assembly generally indicated at 27. Base 24 comprises a flat metallic member of sufficient thickness to provide the necessary rigidity for supporting bellows 25. The base is provided with a connection 28 extending through an aperture 29 in housing portion 13, connection 28 being adapted to receive pressurized air to be admitted to bellows 25. A plurality of mounting pins 31 are also carried by base 24, these pins being received by apertures 32 in housing portion 13.

Bellows 25 comprises a plurality of bellows sections 33 and 34 in alternately stacked relation, each of these sections being fabricated of thin corrugated sheet metal to permit expansion and being secured to each other alternately at their inner and outer portions. The bellows section 34 at the end adjacent base 24 engages the base and is secured thereto. The means for securing the bellows sections to each other and to base 24 and subshoe 26 comprises strips 35 of brazing material disposed within depressions 36 formed in bellows sections 33 and 34. Apertured portions 37 are formed in bellows sections 33 and 34 to interconnect the spaces between the sections and provide a common chamber enclosed by base 24, bellows 25 and subshoe 26 for pressurization from connection 28. This construction is described in greater detail in copending application Serial No. 275,925, filed April 26, 1963 by Sam B. Williams and John F. Jones and assigned to the same assignee of the present application.

Subshoe 26 comprises a sheet metal member somewhat thinner than base 24 and secured to the end bellows section 33 opposite the bellows end secured to base 24. Subshoe 26 is preferably sufficiently flexible in the direction of expansion and contraction of bellows 25 to permit it to accommodate variations in the distance between core 12 and housing portion 13 which may occur due to temperature-created distortions during operation. Although the configuration of subshoe 26 is generally the same as that of base 24 and bellows 25, a pair of ears 38 and 39 are provided on portions 19 and 21 thereof, as seen in FIGURE 1. These ears, which are faired into the other portions of the subshoe, extend away from the area 17 enclosed by seal 11 and are in the same plane as the remainder of the subshoe. The ears serve to support rubbing shoe assembly 27 as described below.

Rubbing shoe assembly 27 comprises a backup plate 41 and a rubbing shoe 42. Backup member 41 is fabricated of sheet metal such as stainless steel, and has the same configuration as that of subshoe 26 including a pair of ears 43 and 44 overlapping ears 38 and 39, respectively. Ears 43 and 44 carry pins 45 and 46, respectively, these pins extending toward ears 38 and 39. Ear 38 has an elongated slot 47 for the reception of pin 45, whereas a circular aperture 48 is provided for the reception of pin 46, as seen in FIGURE 4.

Rubbing member 42 is fabricated of a nonmetallic material having the desired hardness, anti-friction, temperature resistance and flexural characteristics, including a relatively low modulus of elasticity, to enable it to perform its high pressure sealing function. Such materials include graphite and Pyroceram, the latter being the trademark for polycrystalline material made from glass having high flexural strength and heat resistance, and which can be made harder than carbon steel. Other materials which could be used to fabricate rubbing member 42 are aluminum oxide and thin laminated ceramic sheets. The outer surface of rubbing shoe 42 which engages core 12 is provided with a smooth finish.

The configuration of member 42 is the same as that of base 24 and bellows 25, without ears corresponding to those on subshoe 26 or backup plate 41. Rubbing shoe 42 is shown as being fabricated of a single sheet of material, although it could be made up of segments closely fitted together. The thickness of rubbing shoe 42 is preferably somewhat greater than that of backup plate 41. In one suitable construction, the thickness of backup plate 41 was about 0.025 inch and that of rubbing shoe 42 about 0.080 inch.

Shoe 42 is fastened to backup plate 41 by a layer 49 of an adhesive material such as brazing metal or glue. A plurality of lugs 51 are formed on the inner and outer edges of backup plate 41, these lugs extending toward rubbing shoe 42 and being engageable with the inner and outer edges thereof to aid in retention of the rubbing shoe on the backup plate. Lugs 51 are in spaced relation so as not to interfere with the flexural characteristics of rubbing shoe assembly 27, but are disposed around the entire peripheries of the inner and outer backup plate edges except for the outer edge in the vicinity of ears 43 and 44. The height of lugs 51 is such that they will not extend beyond the outer surface of rubbing shoe 42, as seen in FIGURES 2 and 3.

In assembling rubbing shoe assembly 27 to subshoe 26, it is merely necessary to mount pins 45 and 46 in slot 47 and aperture 48, respectively. In operation, the pressure applied to the bellows' interior will force rubbing shoe 42 against the facing surface of core 12, thus preventing outward leakage of the compressed air in area 17. To replace a rubbing shoe assembly 27 having a worn or damaged rubbing shoe 42, assembly 27 may be removed by withdrawing pins 45 and 46 from slot 47 and aperture 48, and mounting a new assembly 27 in position.

It should be noted that the use of backup plate 41 to carry rubbing shoe 42 permits proper retention of the rubbing shoe in position as well as easy replacement thereof. This is because ears 43 and 44 as well as lugs 51 may be readily formed on metal backup plate 41. The pin-and-aperture mounting means used with ears 43 and 44 not only permits quick assembly and disassembly of the rubbing shoe but greatly reduces the maintenance costs of the seal, since it eliminates the necessity of replacing the entire unit when the rubbing shoe is worn. Moreover, elongated slot 47 permits relative expansion and contraction between rubbing shoe assembly 27 and subshoe 26 due to temperature changes during operation. The presence of lugs 51 aids considerably in proper retention of rubbing shoe 42, preventing shifting of the rubbing shoe with respect to its support. The presence of backup plate 41 also facilitates handling of rubbing shoe 42 which, in the case of some materials such as graphite, is highly fragile. The fact that all the components of seal 11 except for rubbing shoe 42 may be fabricated of metal will contribute to the rigidity of the assembly in resisting outward forces created by the compressed air within area 17, thus preventing distortion of rubbing shoe 42 which might detract from its sealing engagement with core 12.

While it will be apparent that the preferred embodiment of the invention disclosed is well calculated to fullfill the objects above stated, it will be appreciated that the invention is susceptible to modification, variation and change without departing from the proper scope or fair meaning of the subjoined claims.

What is claimed is:

1. In a high pressure dynamic seal, a base, a subshoe, an expandable sheet metal bellows between said base and said subshoe and forming a common chamber therewith, means for pressurizing said chamber, a nonmetallic rubbing shoe assembly comprising a sheet metal backup plate and a rubbing shoe permanently bonded thereto, said backup plate and rubbing shoe having edges in registry along the major portion thereof, a plurality of spaced lugs on the edges of said backup plate bent toward said rubbing shoe and in retaining relation therewith, and means for removably mounting said backup plate on said subshoe.

2. The combination according to claim 1, said last-mentioned means comprising overlapping ears on said subshoe and backup plate, and pin-and-aperture connections carried by said ears.

3. In a high pressure dynamic seal, a flat metallic base, a flat metallic subshoe, a bellows comprising a plurality of expandable deformable sheet metal sections disposed between said base and subshoe, said sections being brazed together and to said base and subshoe to form a common chamber therewith, means for pressurizing said chamber, a rubbing shoe assembly comprising a flat sheet metal backup plate and a rubbing shoe permanently bonded thereto, said rubbing shoe being fabricated of a material having high wear and temperature resistance properties, low friction properties and a low modulus of elasticity, a plurality of lugs in spaced relation along the edges of said backup plate bent toward and in retaining relation with said rubbing shoe, and means removably mounting said backup plate on said subshoe.

4. In a high pressure dynamic seal for use between a rotary gas turbine regenerator core and an adjacent housing portion of the gas turbine, a flat metallic base having a generally segmental configuration enclosing the area through which compressed air is to pass, means for mounting said base on said housing portion, a bellows having the same configuration as the base and comprising a plurality of stacked flexible sheet metal sections brazed together, one end of said bellows being brazed to said base, a flat metal subshoe having the same general configuration as said base and bellows and brazed to the other end of said bellows, the bellows, base and subshoe together forming a common chamber, means carried by said base for pressurizing said chamber, a rubbing shoe assembly comprising a flat sheet metal backup plate having the same general configuration as said subshoe, a flat rubbing shoe fabricated of a nonmetallic material having high wear, hardness and temperature resistance characteristics, low friction properties and a relatively low modulus of elasticity, means permanently adhering said rubbing shoe to said backup plate, a plurality of spaced lugs formed along the inner and outer edges of said backup plate and bent toward said rubbing shoe in retaining relation therewith, overlapping ears extending outwardly from said subshoe and backup plate, pins carried by said backup plate ears, and apertured portions in said subshoe ears receiving said pins whereby said rubbing shoe is removably mounted on said subshoe.

5. In a high pressure dynamic seal, a base, a subshoe, an expandable sheet metal bellows between said base and said subshoe and forming a common chamber therewith, a nonmetallic rubbing shoe assembly comprising a sheet metal backup plate and a rubbing shoe permanently bonded thereto, said backup plate and rubbing shoe having edges in registry along the major portion thereof, a plurality of spaced lugs on the edges of said backup plate bent toward said rubbing shoe and in retaining relation therewith, and means for removably mounting said backup plate on said subshoe.

References Cited by the Examiner

UNITED STATES PATENTS

| | | | |
|---|---|---|---|
| 1,763,574 | 6/30 | Williams | 277—88 X |
| 2,005,587 | 6/35 | Loring | 277—88 |
| 2,576,673 | 11/51 | Cole | 277—34 |
| 2,969,644 | 1/61 | Williams et al. | 277—34 X |

FOREIGN PATENTS 647,650   12/50   Great Britain.

LEWIS J. LENNY, *Primary Examiner.*

SAMUEL ROTHBERG, *Examiner.*